(12) United States Patent
Jing et al.

(10) Patent No.: US 10,771,660 B2
(45) Date of Patent: *Sep. 8, 2020

(54) AUTOMATICALLY DETERMINING A WET MICROPHONE CONDITION IN A CAMERA

(71) Applicant: GoPro, Inc., San Mateo, CA (US)

(72) Inventors: Zhinian Jing, Pacifica, CA (US); Ke Li, San Jose, CA (US); Erich Tisch, San Francisco, CA (US); Joyce Rosenbaum, Mountain View, CA (US); Magnus Hansson, Los Altos, CA (US)

(73) Assignee: GoPro, Inc., San Mateo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/440,430

(22) Filed: Jun. 13, 2019

(65) Prior Publication Data
US 2019/0364177 A1    Nov. 28, 2019

Related U.S. Application Data

(63) Continuation of application No. 15/674,355, filed on Aug. 10, 2017, now Pat. No. 10,362,199, which is a
(Continued)

(51) Int. Cl.
*H04R 25/00* (2006.01)
*H04R 29/00* (2006.01)
(Continued)

(52) U.S. Cl.
CPC ........... *H04N 5/2252* (2013.01); *G03B 17/08* (2013.01); *H04R 1/44* (2013.01); *H04R 3/00* (2013.01);
(Continued)

(58) Field of Classification Search
CPC ........ G03B 17/08; H04N 5/2252; H04R 1/44; H04R 2410/05; H04R 2410/07;
(Continued)

(56) References Cited

U.S. PATENT DOCUMENTS

| 5,508,766 A | 4/1996 | Boyd |
|---|---|---|
| 6,292,213 B1 | 9/2001 | Jones |

(Continued)

OTHER PUBLICATIONS

PCT International Search Report and Written Opinion for PCT/US2016/039679, dated Dec. 12, 2016, 18 pages.
(Continued)

*Primary Examiner* — Khai N. Nguyen
(74) *Attorney, Agent, or Firm* — Young Basile Hanlon & MacFarlane, P.C.

(57) ABSTRACT

An audio capture system for a sports camera includes at least one "enhanced" microphone and at least one "reference" microphone. The enhanced microphone includes a drainage enhancement feature to enable water to drain from the microphone more quickly than the reference microphone. A microphone selection controller selects between the microphones based on a microphone selection algorithm to enable high quality in conditions where the sports camera transitions in and out of water during activities such as surfing, water skiing, swimming, or other wet environments.

20 Claims, 8 Drawing Sheets

Related U.S. Application Data continuation of application No. 15/083,266, filed on Mar. 28, 2016, now Pat. No. 9,769,364.

(60) Provisional application No. 62/188,450, filed on Jul. 2, 2015.

(51) Int. Cl.

| | | |
|---|---|---|
| *H04R 3/00* | (2006.01) | |
| *H04N 5/225* | (2006.01) | |
| *G03B 17/08* | (2006.01) | |
| *H04R 5/04* | (2006.01) | |
| *H04R 1/44* | (2006.01) | |

(52) U.S. Cl.
CPC ............. *H04R 3/005* (2013.01); *H04R 5/04* (2013.01); *H04R 29/004* (2013.01); *H04R 2410/05* (2013.01); *H04R 2410/07* (2013.01); *H04R 2499/11* (2013.01)

(58) Field of Classification Search
CPC .... H04R 2499/11; H04R 29/004; H04R 3/00; H04R 3/005; H04R 5/04
USPC .............................. 381/58, 95, 122, 165, 355
See application file for complete search history.

(56) References Cited

U.S. PATENT DOCUMENTS

| | | | |
|---|---|---|---|
| 6,318,826 B1 | 11/2001 | Froger | |
| 6,349,824 B1 | 2/2002 | Yamada | |
| 7,023,338 B1 | 4/2006 | Foth | |
| 8,625,819 B2* | 1/2014 | Goldstein | H04R 25/02 381/110 |
| 8,963,875 B2* | 2/2015 | Sugiura | G06F 1/1694 178/18.05 |
| 9,251,687 B2* | 2/2016 | Thompson | G08B 21/10 |
| 9,301,412 B2* | 3/2016 | Micko | F16B 9/026 |
| 9,386,364 B2 | 7/2016 | Aihara | |
| 9,485,573 B2* | 11/2016 | Black | H04W 84/08 |
| 9,661,195 B2* | 5/2017 | Jing | G03B 17/08 |
| 9,706,088 B2* | 7/2017 | Jing | G03B 17/08 |
| 9,769,364 B2* | 9/2017 | Jing | H04R 3/00 |
| 9,787,884 B2* | 10/2017 | Tisch | H04R 29/004 |
| 9,807,501 B1* | 10/2017 | Tisch | H04R 29/005 |
| 9,807,530 B1* | 10/2017 | Tisch | G06F 3/165 |
| 10,362,199 B2* | 7/2019 | Jing | H04R 29/004 |
| 2005/0114128 A1 | 5/2005 | Hetherington | |
| 2007/0110416 A1 | 5/2007 | Yamaguchi | |
| 2007/0115387 A1 | 5/2007 | Ho | |
| 2009/0052715 A1 | 2/2009 | Zhang | |
| 2009/0213557 A1 | 8/2009 | Wen | |
| 2010/0207785 A1* | 8/2010 | Suganuma | F23J 1/00 340/870.16 |
| 2010/0225461 A1 | 9/2010 | Tuli | |
| 2011/0118858 A1* | 5/2011 | Rottler | H04L 63/08 700/94 |
| 2011/0147245 A1 | 6/2011 | Yim | |
| 2012/0039495 A1* | 2/2012 | Ono | H04R 1/1083 381/309 |
| 2012/0123772 A1 | 5/2012 | Thyssen | |
| 2012/0188690 A1 | 7/2012 | Aihara | |
| 2012/0249470 A1* | 10/2012 | Sugiura | G06F 1/1643 345/174 |
| 2012/0250270 A1 | 10/2012 | Liu | |
| 2012/0275620 A1* | 11/2012 | Matsuo | H04R 3/005 381/92 |
| 2013/0150117 A1* | 6/2013 | Rodriguez | G06K 9/00892 455/550.1 |
| 2013/0282369 A1* | 10/2013 | Visser | G10L 21/0208 704/226 |
| 2014/0023348 A1* | 1/2014 | O'Kelly | G11B 27/031 386/278 |
| 2014/0185853 A1* | 7/2014 | Aihara | H04R 1/086 381/334 |
| 2014/0198932 A1* | 7/2014 | Parkins | H04R 1/086 381/189 |
| 2014/0313044 A1* | 10/2014 | Thompson | G08B 21/10 340/686.6 |
| 2015/0326748 A1* | 11/2015 | Tisch | G06T 7/20 348/231.4 |
| 2015/0345699 A1* | 12/2015 | Manniche | F16M 13/022 29/428 |
| 2015/0351266 A1* | 12/2015 | Micko | F16B 9/026 361/809 |
| 2015/0373450 A1* | 12/2015 | Black | H04W 84/08 455/11.1 |
| 2016/0080861 A1 | 3/2016 | Helm | |
| 2016/0146935 A1 | 5/2016 | Lee | |
| 2016/0241945 A1 | 8/2016 | Zadesky | |
| 2016/0277818 A1 | 9/2016 | Jones | |
| 2016/0301998 A1 | 10/2016 | Abe | |
| 2017/0006396 A1* | 1/2017 | Jing | H04N 5/2252 |
| 2017/0006398 A1* | 1/2017 | Jing | H04R 5/04 |
| 2017/0339320 A1* | 11/2017 | Jing | H04N 5/2252 |
| 2018/0084358 A1* | 3/2018 | Tisch | H04R 1/083 |
| 2019/0364177 A1* | 11/2019 | Jing | H04R 3/00 |

OTHER PUBLICATIONS

PCT Invitation to Pay Additional Fees And, Where Applicable, Protest Fee, for PCT/US2016/039679, dated Oct. 13. 2016. 7 pages.
United States Office Action, U.S. Appl. No. 15/083,266, dated Jan. 10, 2017, seven pages.

* cited by examiner

AUTOMATICALLY DETERMINING A WET MICROPHONE CONDITION IN A CAMERA

CROSS-REFERENCE TO RELATED APPLICATIONS

This application is a continuation of U.S. application Ser. No. 15/674,355, filed on Aug. 10, 2017, now U.S. Pat. No. 10,362,999, which is a continuation of U.S. application Ser. No. 15/083,266, filed Mar. 28, 2016, now U.S. Pat. No. 9,769,364, which application claims the benefit of U.S. Provisional Application No. 62/188,450, filed on Jul. 2, 2015, the contents of which are incorporated by reference in their entirety.

BACKGROUND

Technical Field

This disclosure relates to audio capture, and more specifically, to the selecting between multiple available microphones in an audio capture system.

Description of the Related Art

In a camera designed to operate both in and out of water, the audio subsystem can be stressed to the point where the resulting signal captured by the microphone is distorted and unnatural. The transition between the two environments can be particularly challenging due to the impulse of splashing water. During certain activities such as surfing, swimming, or other water sports, transition in and out of water may occur frequently over an extended period of time.

BRIEF DESCRIPTIONS OF THE DRAWINGS

The disclosed embodiments have other advantages and features which will be more readily apparent from the following detailed description of the invention and the appended claims, when taken in conjunction with the accompanying drawings, in which:

Figure (FIG. 1 is a block diagram illustrating an example embodiment of an audio capture system.

DETAILED DESCRIPTION

Figure 1:
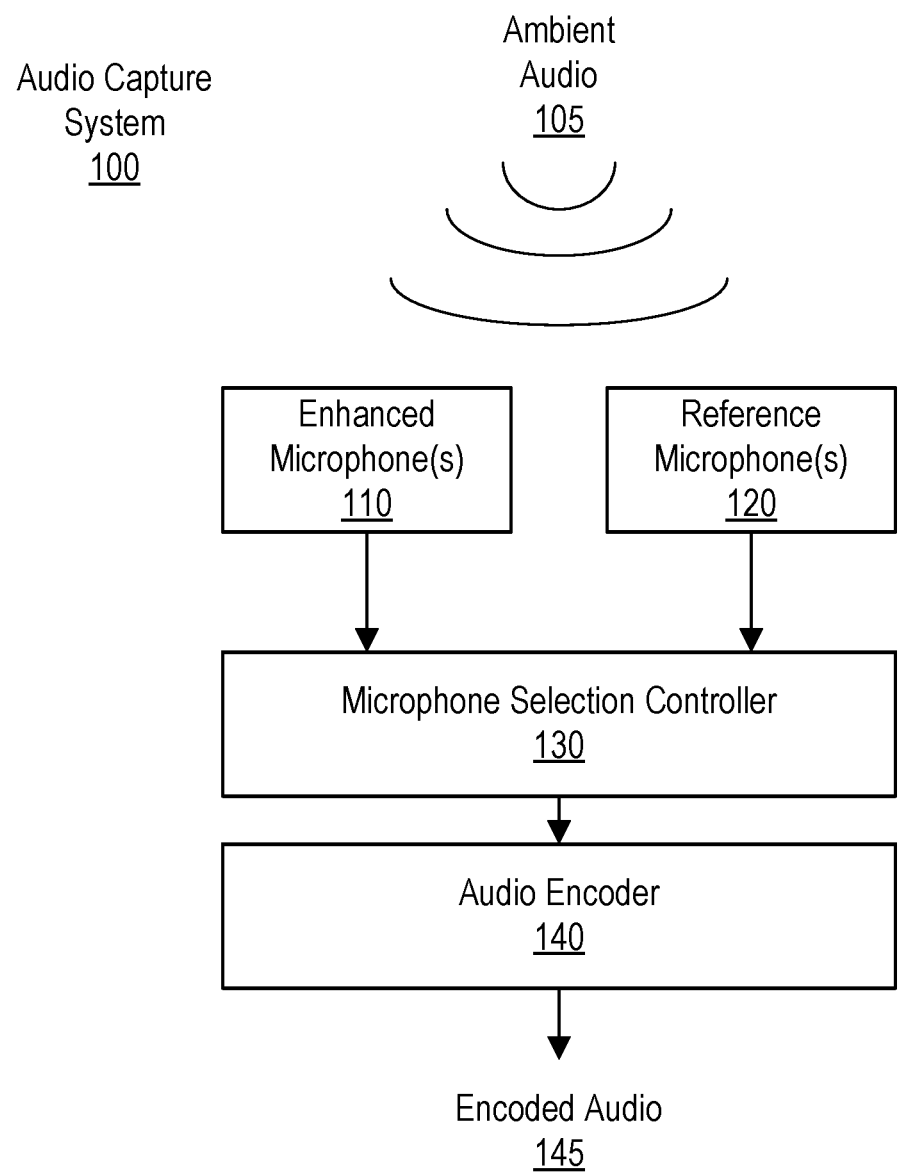

The figures and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Configuration Overview

In a first embodiment, an output audio signal is generated in an audio capture system having multiple microphones including at least a first microphone and a second microphone. The first microphone includes a drainage enhancement feature structured to drain liquid more quickly than the second microphone lacking the drainage enhancement feature. A first audio signal is received from the first microphone representing ambient audio captured by the first microphone during a time interval. A second audio signal is received from the second microphone representing ambient audio captured by the second microphone during the time interval. A correlation metric is determined between the first audio signal and the second audio signal representing a similarity between the first audio signal and the second audio signal. Responsive to the correlation metric exceeding a predefined threshold, the first audio signal is outputted for the time interval. Responsive to the correlation metric not exceeding the first predefined threshold, a first noise metric is determined for the first audio signal and a second noise metric is determined for the second audio signal. Responsive to the sum of the first noise metric and a bias value being less than the second noise metric, the first audio signal is output for the time interval. Responsive to the sum of the first noise metric and the bias value being greater than the second noise metric, the second audio signal is output for the time interval.

In a second embodiment, an output audio signal is generated in an audio capture system having multiple microphones including at least a first microphone and a second microphone. The first microphone includes a drainage enhancement feature structured to drain liquid more quickly than the second microphone lacking the drainage enhancement feature. A first audio signal is received from the first microphone representing ambient audio captured by the first microphone during a time interval. A second audio signal is received from the second microphone representing ambient audio captured by the second microphone during the time interval. A correlation metric is determined between the first audio signal and the second audio signal representing a similarity between the first audio signal and the second audio signal. Responsive to the correlation metric exceeding a first predefined threshold, the first audio signal is output for the time interval. Responsive to the correlation metric not exceeding the first predefined threshold, it is determined whether the microphones are submerged in liquid. If the microphones are not submerged, it is determined whether the first microphone is wet. If the first microphone is wet, the second microphone signal is output for the time interval. Responsive to determining that first microphone is not wet or that the microphones are submerged, a first noise metric is determined for the first audio signal and a second noise metric is determined for the second audio signal. Responsive to the sum of the first noise metric and a bias value being less than the second noise metric, the first audio signal is output for the time interval. Responsive to the sum of the first noise metric and the bias value being greater than the second noise metric, the second audio signal is output for the time interval.

In another embodiment, a method determines if a first microphone is wet in an camera system having a first microphone and a second microphone, where the first microphone is positioned in a recess of an inner side of a face of the camera, where the recess is coupled to a channel coupled to a lower drain below the channel to drain water from the recess away from the microphone via the channel, and where the second microphone is positioned away from the channel and the drain. A first average signal level of the first audio signal and a second average signal level of the second audio signal are determined over a predefined time interval. A ratio of the first average signal level to the second average signal level is determined. Responsive to the ratio of the first average signal level to the second average signal level exceeding a first threshold or detecting a wind condition, it is determined that a wet microphone condition is not detected. Responsive to the ratio of the first average signal level to the second average signal level not exceeding the first threshold and not detecting the wind condition, it is determined that the wet microphone condition is detected.

In another embodiment, a camera comprises a lens assembly, a substantially cubic camera housing, a first microphone, a lower drain, an upper drain, a channel, and a second microphone. The lens assembly directs light received through a lens window to an image sensor. The substantially cubic camera housing encloses the lens assembly and comprises a bottom face, left face, right face, back face, top face, and front face. The first microphone is integrated with the front face of the camera and positioned within a recess on an interior facing portion of the front face. The lower drain is below the first microphone and comprises an opening in the substantially cubic camera housing near the front face. The lower drain allows water that collects in the recess housing the first microphone to drain. The upper drain is above the first microphone and comprises an opening in the substantially cubic housing near the front face. The upper drain allows air to enter the recess as the water drains. The channel through the interior facing portion of the front face couples the recess to the lower drain. The second microphone is integrated with a rear portion of the substantially cubic camera housing.

In yet another embodiment, an audio capture system comprises a substantially cubic housing including a bottom face, left face, right face, back face, top face, and front face. A first microphone is integrated with the front face of the audio capture system and positioned within a recess on an interior facing portion of the front face. A lower drain below the first microphone comprises an opening in the substantially cubic housing near the front face to allow water that collects in the recess housing the first microphone to drain. An upper drain above the first microphone comprises an opening in the substantially cubic housing near the front face to allow air to enter the recess as the water drains. A channel through the interior facing portion of the front face couples the recess to the lower drain. A second microphone is integrated with a rear portion of the substantially cubic housing.

Example Audio Capture System

FIG. 1 illustrates an example of an audio capture system 100 including multiple microphones. The audio capture system 100 includes at least one "enhanced" microphone 110, at least one "reference" microphone 120, a microphone selection controller 130, and an audio encoder 140. The enhanced microphone 110 includes a drainage enhancement feature to enable water to drain from the microphone more quickly than the reference microphone 120. The drainage enhancement feature may be accomplished utilizing gravity and/or surface tension forces. In various embodiments, the drainage enhancement feature may be implemented using an inner surface energy coating or particular hole dimensions, shapes, density, patterns, or interior curvature or a combination of features that affect that drainage profile of the enhanced microphone 110. The enhanced microphone 110 can therefore recover relatively quickly when moved from in water to out of water and therefore mitigates the frequency response distortion leading to muffled, unnatural sound when water is trapped on the membrane over the microphone or obscures the acoustic pathways to the microphone. In contrast, the reference microphone 120 includes a physical barrier between the splashing water and a waterproof membrane over the microphone to mitigate the impulses from splashing water. For example, in one embodiment, the barrier comprises a plastic barrier that absorbs some of the water impact impulse. In another embodiment, an air buffer may exist between the barrier and the waterproof membrane over the microphone. In another embodiment, a porting structure traps a buffer layer of water on the outside of a waterproof membrane over the microphone, thus creating a protective layer that blocks splashing water from directly impacting the waterproof membrane. Additionally, the muffling quality of water pooled on the waterproof membrane reduces some high frequency content of the splashing water.

In operation, both the enhanced microphone 110 and reference microphone 120 capture ambient audio 105 and pass the captured audio to the microphone selection controller 130. The audio captured by the enhanced microphone 110 and the reference microphone 120 may have varying audio characteristics due to the different structural features of the microphones 110, 120. Typically, the enhanced microphone 110 will have more spectral artifacts both in open air and when operating under water due to the drainage enhancement feature. Furthermore, the enhanced microphone 110 may have degraded signal-to-noise in windy conditions due to the drainage enhancement feature. However, the enhanced microphone 110 will generally have better signal-to-noise ratio performance out of water in non-windy conditions relative to the reference microphone 120. Therefore, a different selection between the enhanced microphone 110 and the reference microphone 120 may be desirable under different audio capture conditions.

The microphone selection controller 130 processes the audio captured from the enhanced microphone 110 and the reference microphone 120 and selects, based on the audio characteristics, which of the audio signals to pass to the audio encoder 140. In one embodiment, the microphone selection controller 130 operates on a block-by-block basis. In this embodiment, for each time interval, the microphone selection controller 130 receives a first block of audio data from the enhanced microphone and a second block of audio data from the reference microphone 120, each corresponding to ambient audio 105 captured by the respective microphones 110, 120 during the same time interval. The microphone selection controller 130 processes the pair of blocks to determine which block to pass the audio encoder 140.

In one embodiment, the microphone selection controller 130 generally operates to select the enhanced microphone 110 directly after transitioning out of water since the enhanced microphone 110 tends to drain the water faster and has better out of water audio quality. Furthermore, the microphone selection controller 130 generally operates to select the reference microphone 120 when in the water and when transitioning between air and water because it better mitigates the unnatural impulses caused by splashing water.

The audio encoder 140 encodes the blocks of audio received from the microphone selection controller 130 to generate an encoded audio signal 145.

In an embodiment, the microphone selection control 130 and/or the audio encoder 140 are implemented as a processor and a non-transitory computer-readable storage medium storing instructions that when executed by the processor carry out the functions attributed to the microphone selection controller 130 and/or audio encoder 140 described herein. The microphone selection controller 130 and audio encoder 140 may be implemented using a common processor or separate processors. In other embodiments, the microphone selection controller 130 and/or audio encoder 140 may be implemented in hardware, (e.g., with an FPGA or ASIC), firmware, or a combination of hardware, firmware and software.

Figure 5:
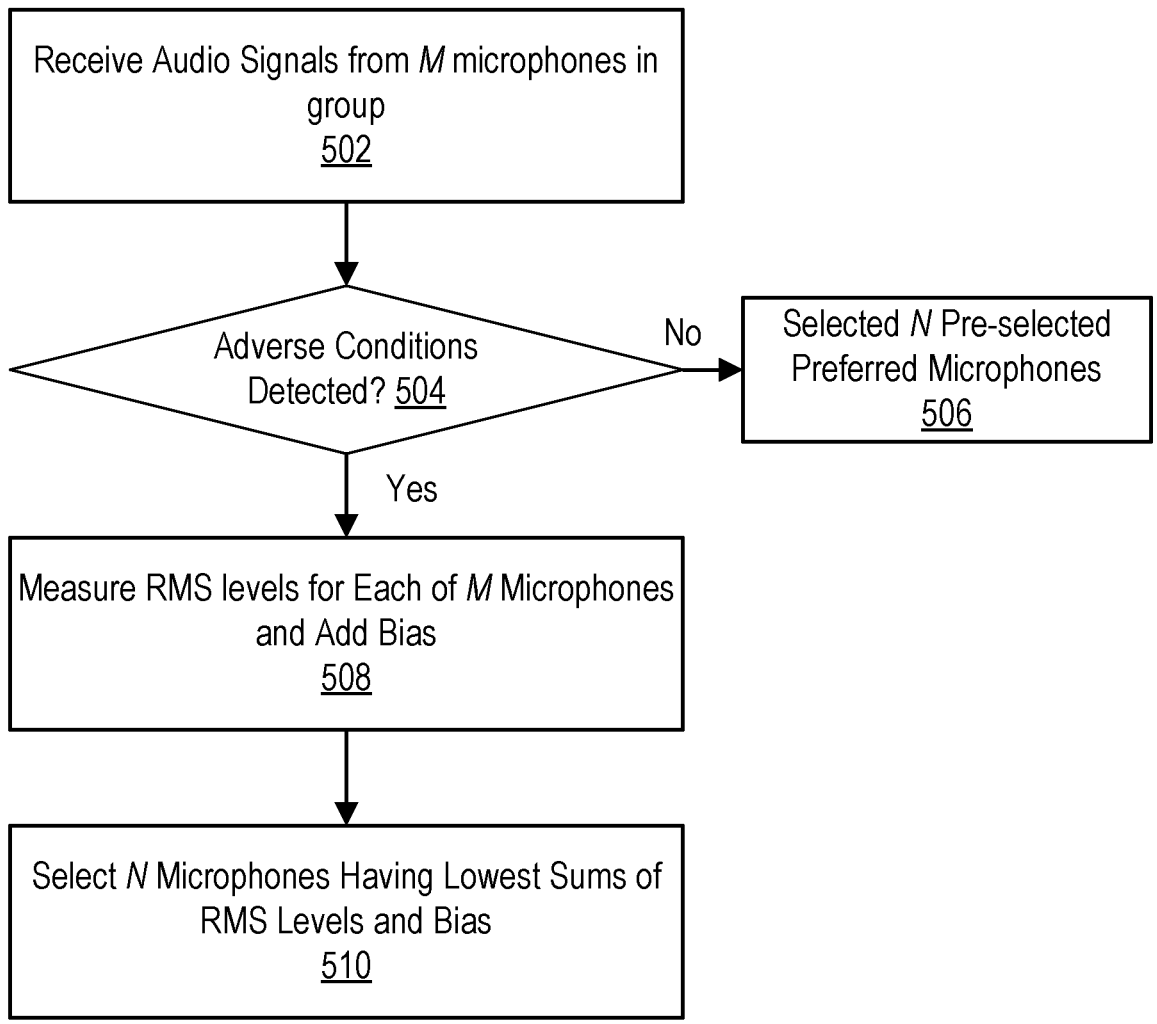
FIG. 5 is a flowchart illustrating an embodiment of a process for selecting a subset of microphones out of a group of microphones.

In an embodiment, the audio capture system 100 is implemented within a camera system such as the camera 500 described below with respect to FIG. 5. Such a camera may use the encoded audio 145 captured by the audio capture system 100 as an audio channel for video captured by the camera. Thus, the audio capture system 100 may capture audio in a manner that is concurrent and synchronized with corresponding frames of video.

Figure 2:
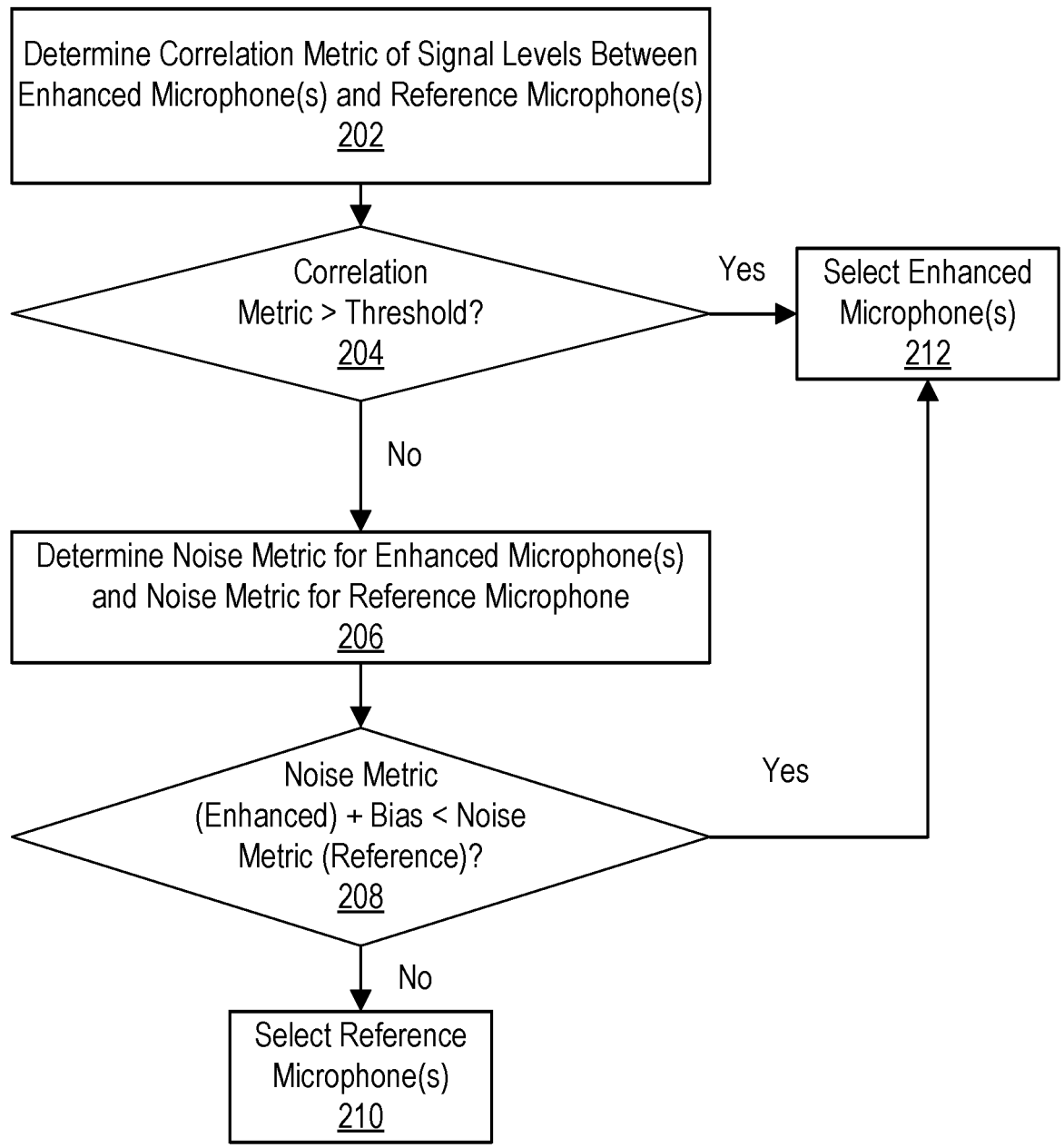
FIG. 2 is a flowchart illustrating a first embodiment of a process for selecting between audio signals from different microphones in an audio capture system with multiple microphones.

FIG. 2 is a flowchart illustrating an embodiment of a process for selecting between an enhanced microphone 110 and a reference microphone 120. A correlation metric is determined 202 between signal levels of audio blocks captured by the enhanced microphone 110 and reference microphone 120 respectively. The correlation metric represents a similarity between a first audio signal captured from the enhanced microphone 110 during a time interval and a second audio signal captured from the reference microphone 120 during the same time interval. Generally, the signals will be well-correlated in the absence of wind noise, but will be poorly correlated when wind noise is present. Thus, the correlation metric may operate as a wind detector. In one embodiment, the correlation metric comprises a value from 0 to 1 where a correlation metric of 1 represents a situation where there is no wind, and a correlation metric of 0 means that the captured audio is entirely wind noise. In one embodiment, the correlation metric is determined using a correlation function that includes a regularization term γ to handle low level signals. For example, in one embodiment, the correlation function is given by:

$$X = \max(0, \Sigma_{n=0}^{N-1}(L[n]+\gamma)*(R[n]+\gamma)) \quad (1)$$

where (*) represents a scalar multiplication, N is the block size, γ is the regularization term (e.g., γ=0.001), and L[n] and R[n] are the samples from the enhanced microphone and reference microphone respectively. The max operator constrains the correlation metric X to be in the range 0 and +1. In one embodiment, the correlation metric is calculated over a predefined spectral range (e.g., 600-1200 Hz). Using a restricted range beneficially eliminates or reduces artifacts caused by vibration (which typically occur at low frequencies) and reduces the amount of processing relative to calculating the metric over the full frequency spectrum. In one embodiment, the correlation metric is updated at a frequency based on the audio sample rate and sample block size. For example, if a 32 kHz sampling rate is used with a block size of 1024 samples, the correlation metric may be updated approximately every 32 milliseconds. In one embodiment, the correlation metric is smoothed over time.

The correlation metric is compared 204 to a predefined threshold. In one embodiment, the predefined threshold may changes between two or more predefined thresholds depending on the previous state (e.g., whether the reference microphone or enhanced microphone was selected) to include a hysteresis effect. For example, if for the previously processed block, the correlation metric exceeded the predefined threshold (e.g., a predefined threshold of 0.8) indicating that low wind noise detected, then the predefined threshold is set lower for the current block (e.g. 0.7). If for the previously processed block, the correlation metric did not exceed the predefined threshold (e.g., a predefined threshold of 0.8), indicating that high wind noise was detected, then the predefined threshold for the current block is set higher (e.g., to 0.8).

If the correlation metric exceeds 204 a predefined threshold, then the enhanced microphone 110 is selected because it typically has better signal-to-noise ratio. If the correlation metric does not exceed 204 the predefined threshold, noise metrics are determined for the audio signals captured by the enhanced microphone 110 and the reference microphone 120. Under some conditions, it may be reasonably presumed that both microphones 110, 120 pick up the desired (noiseless) signal at approximately, the same level and if one of the microphones is slightly blocked, then the correlation metric will still be relatively high indicating that there is low wind. Furthermore, it may be reasonably presumed that noise from the effects of wind or water is local to each microphone and that the noise will not destructively cancel out the signal. Based on these assumptions, the microphone that is louder during a low correlation condition is determined to be the microphone that has the noise. Thus, in one embodiment, the noise metrics simply comprise root-mean-squared amplitude levels of the enhanced and reference microphones over a predefined time period. For example, the predefined time period may include a sliding time window that includes the currently processed block and a fixed number of blocks prior to the current block (e.g., an approximately 4 second window). In another embodiment, a recursive-based RMS value is used (e.g., with a time constant of approximately 4 seconds). In one embodiment, the noise metric is based on equalized amplitude levels of the microphones. The equalization levels are set so that the microphones have similar amplitude characteristics under normal conditions (e.g., non-windy and non-watery conditions). In one embodiment, the noise metric is measured across substantially the entire audible band (e.g., between 20 Hz and 16 kHz).

If the sum of the noise metric for the enhanced microphone 110 and a bias value is less than the noise metric for the reference microphone 120, then the microphone selection controller 130 selects 212 the enhanced microphone. On the other hand, if the sum of the noise metric for the enhanced microphone 110 and the bias value is not less than (e.g., greater than) the noise metric for the reference microphone 120, then the microphone selection controller 130 selects 212 the reference microphone 120.

In one embodiment, the bias value may comprise either a positive or negative offset that is dynamically adjusted based on the correlation metric. For example, if the correlation metric is below a lower threshold (e.g., 0.4), then a first bias value is used which may be a positive bias value (e.g., 10 dB). If the correlation metric is above an upper threshold (e.g., 0.8), then a second bias value is used which may be a negative bias value (e.g., −6 dB). If the correlation metric is between the lower threshold (e.g., 0.4) and the upper threshold (e.g., 0.8), the bias value is a linear function of the correlation metric X For example, in one embodiment, the bias value is given by:

$$\text{bias} = \begin{cases} bias_1, & X \le Th_L \\ \frac{bias_1 - bias_2}{Th_L - Th_U}(X - Th_L) + bias_1, & Th_L < X < Th_U \\ bias_2, & X \ge Th_U \end{cases} \quad (2)$$

where $bias_1$ is the first bias value used when the correlation metric X is below the lower threshold $Th_L$ and $bias_2$ is the second bias value used when the correlation metric X is above the upper threshold $Th_U$.

In one embodiment, a hysteresis component is additionally included in the bias value. In this embodiment, the bias value is adjusted up or down depending on whether the reference microphone 120 or the enhanced microphone 110 was selected for the previous block, so as to avoid switching between the microphones 110, 120 too frequently. For example, in one embodiment, if the enhanced microphone 110 was selected for the previous block, an additional hysteresis bias (e.g., 5 db) is subtracted from the bias value to make it more likely that the enhanced microphone 110 will be selected again as shown in the equation below:

$$\text{bias} = \begin{cases} bias_1 - bias_H, & X \le Th_L \\ \frac{bias_1 - bias_2}{Th_L - Th_U}(X - Th_L) + bias_1 - bias_H, & Th_L < X < Th_U \\ bias_2 - bias_H, & X \ge Th_U \end{cases} \quad (3)$$

where $bias_H$ is the hysteresis bias.

On the other hand, if the reference microphone 120 was selected for the previous block, the additional hysteresis bias (e.g, 5 dB) is added to the bias value to make it more likely that the reference microphone is selected again as shown in the equation below:

$$\text{bias} = \begin{cases} bias_1 + bias_H, & X \le Th_L \\ \frac{bias_1 - bias_2}{Th_L - Th_U}(X - Th_L) + bias_1 + bias_H, & Th_L < X < Th_U \\ bias_2 + bias_H, & X \ge Th_U \end{cases} \quad (4)$$

The bias value takes into account that not all wind level is created equal. It is possible to have wind that is softer, but generates more perceptive noise, than a louder wind. With high amounts of wind (low correlation metric), the enhanced microphone 110 tends to generate more perceptive noise than the reference microphone 120 during high wind condition due to the drainage enhancement feature. Thus, the bias value is used to penalize the enhanced microphone 110 for low correlation metrics.

Figure 3:
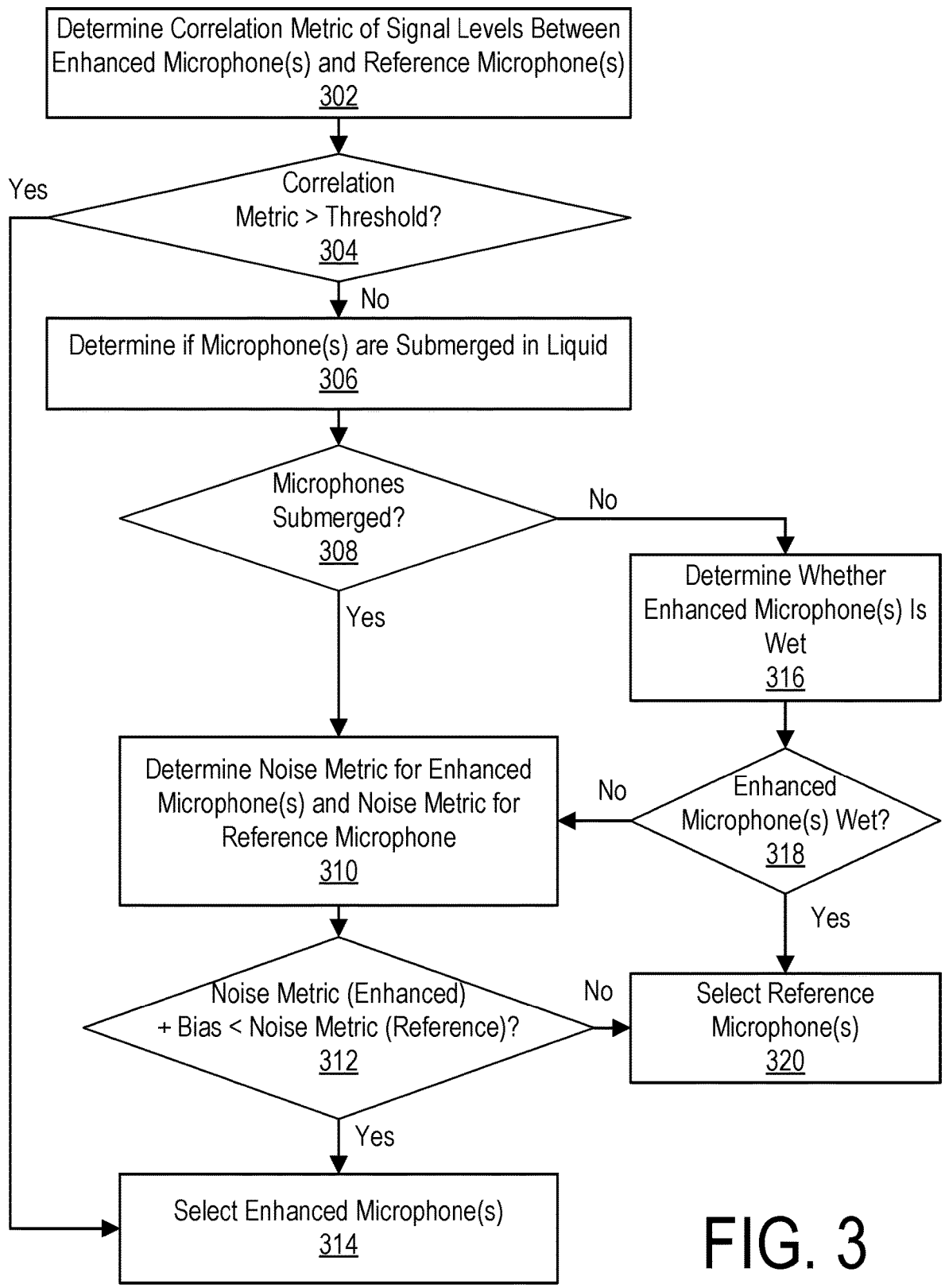
FIG. 3 is a flowchart illustrating a second embodiment of a process for selecting between audio signals from different microphones in an audio capture system with multiple microphones.

FIG. 3 is a flowchart illustrating another embodiment of a process for selecting between an enhanced microphone 110 and a reference microphone 120. A correlation metric is determined 302 between signal levels of audio blocks captured by the enhanced microphone 110 and reference microphone 120 respectively. If the correlation metric exceeds 304 a predefined threshold, then the enhanced microphone 110 is selected because it typically has better signal-to-noise ratio. If the correlation metric does not exceed 304 the threshold, it is determined 306 if the microphones are submerged in liquid (e.g., water). The predefined threshold may be determined in the same manner described above.

In one embodiment, a water submersion sensor may be used to determine if the microphones are submerged. In other embodiment (in which the audio capture system is integrated with a camera), an image analysis may be performed to detect features representative of the camera being submerged in water. For example, detecting color loss may be indicative of the camera being submerged because it causes exponential loss of light intensity depending on wavelength. Furthermore, crinkle patterns may be present in the image when the camera is submerged because the water surface can form small concave and convex lenses that create patches of light and dark. Additionally, light reflecting off particles in the water creates scatter and diffusion that can be detected to determine if the camera is submerged. In yet another embodiment, water pressure on the microphone's waterproof membrane may be detected because the waterproof membrane will deflect under external water pressure. This causes increased tension which shifts the waterproof membrane's resonance higher from its nominal value and can be detected in the microphone signal. Furthermore, the deflection of the waterproof membrane will results in a positive pressure on and deflection of the microphone membrane which could manifest itself as a shift in microphone bias. Additionally, a sensor could be placed near the waterproof membrane to detect an increase in shear force caused by deflection of the waterproof membrane that is indicative of the microphone being submerged.

If the microphones are not submerged, then it is determined 316 whether the enhanced microphone 110 is wet (e.g., not sufficiently drained after being removed from water). In one embodiment, the wet microphone condition can be detected by observing spectral response changes over a predefined frequency range (e.g., 2 kHz-4 kHz) or by detecting the sound pattern known to be associated with a wet microphone as compared to a drained microphone. For example, in one embodiment the spectral features associated with a wet (undrained) microphone can be found through empirical means. In general, when a microphone membrane is wet, higher frequency sounds are attenuated because the extra weight of the water on the membrane reduces the vibration of the membrane. Thus, the water generally acts as a low pass filter. An example of a process for detecting wet microphones is described in FIG. 4 below. In one embodiment, spectral changes can be monitored based on the measured known drain time constant differences between the microphone geometries. If the enhanced microphone 110 is wet (e.g., not sufficiently drained), then the reference microphone 120 is selected 320. Otherwise, if the microphones are submerged or if the enhanced microphone 110 is not wet, then noise metrics are determined 310 for the audio blocks captured by the enhanced microphone 110 and the reference microphone 120. The noise metrics may be determined in the same manner as described above in FIG. 2. If the sum of the noise metric for the enhanced microphone 110 and a bias value is less than the noise metric for the reference microphone 120, then the microphone selection controller 130 selects 314 the enhanced microphone. On the other hand, if the sum of the noise metric for the enhanced microphone 110 and the bias value is not less than the noise metric for the reference microphone 120, then the microphone selection controller 130 selects 320 the reference microphone 120. The bias value may be determined based on equations (2)-(4) described above.

Figure 4:
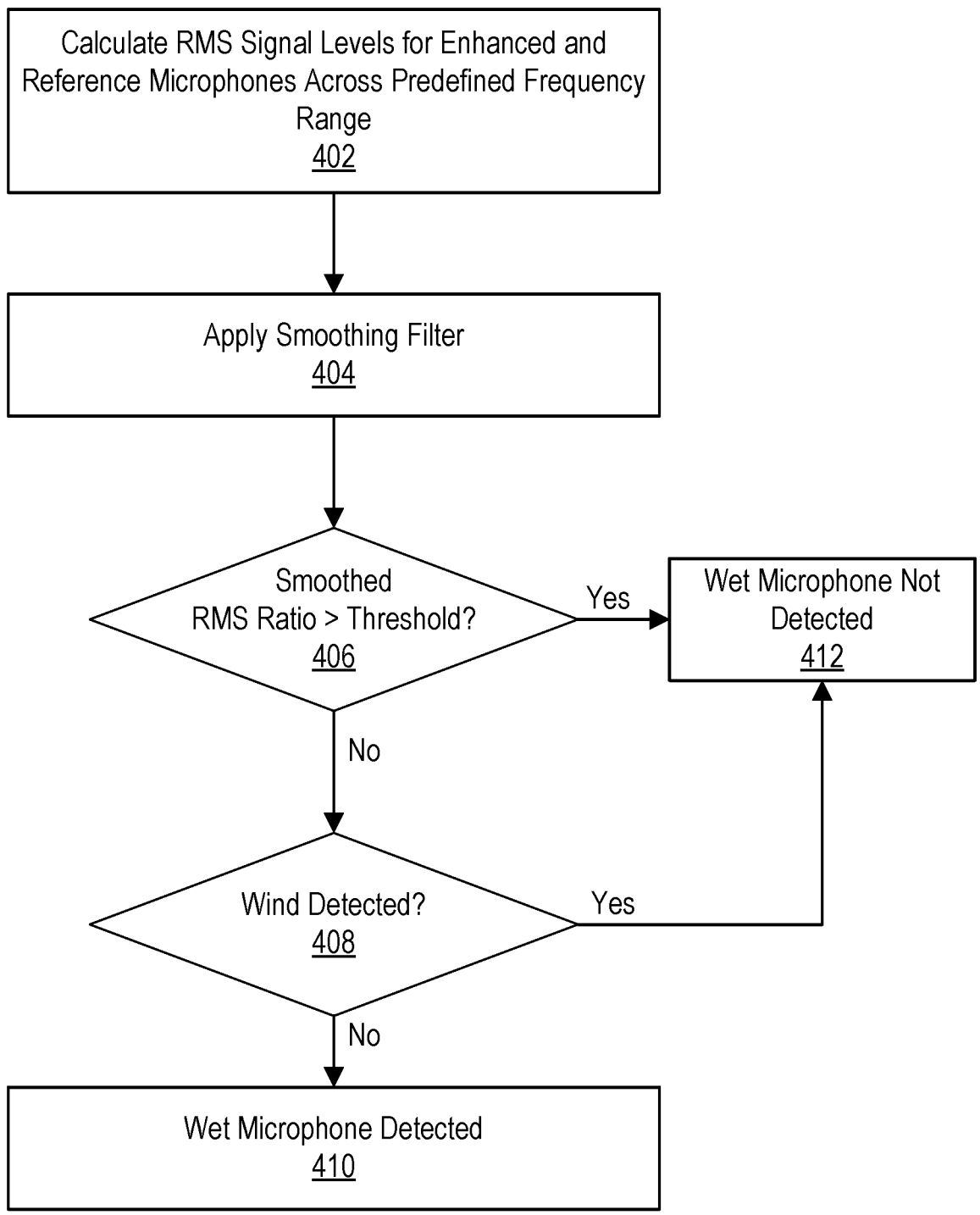
FIG. 4 is a flowchart illustrating an embodiment of a process for detecting a wet microphone condition.

FIG. 4 is a flowchart illustrating an embodiment of a process for detecting a wet microphone. Generally, water on a microphone has a transfer function approximating a low pass filter. The amount of attenuation and the cutoff frequency of the wet microphone transfer function is dependent on how much water is on the microphone. Particularly, the more water on the microphone membrane, the greater the attenuation and the lower the cutoff frequency. This phenomenon is due to the added mass of the water on the microphone membrane dampening the movement of the membrane. In one embodiment, root-mean-squared (RMS) signal levels of the audio blocks captured by the enhanced microphone 110 and reference microphone 120 are calculated 402 across a predefined frequency range (e.g., 2 kHz-4 kHz). A smoothing filter may be applied 404 to smooth the a ratio of the enhanced microphone RMS signal level to the reference microphone RMS signal level over time. If it is determined 406 that the ratio of the enhanced microphone RMS signal level to the reference microphone RMS signal level is above a predefined threshold, then the wet microphone is not detected 412. Otherwise, if it is determined 406 that the ratio of the RMS signal levels is not above the predefined threshold, it is determined 408 if wind is present since the presence of wind can result in similar RMS ratios. The presence of wind can be determined based on, for example, a detection signal from a wind detector that determines the presence of wind based on a correlation metric X as described above. If it is determined 408 that wind noise threshold is met (i.e., the correlation metric is less than a predefined threshold), then the wet microphone is not detected 412. Otherwise, if the wind noise threshold is not met (i.e., the correlation metric is greater than a predefined threshold), then the wet microphone condition is detected 410.

In embodiments where there are two or more enhanced microphones 110 and two or more reference microphones 120, the selection algorithm described above may be applied to a group of enhanced microphones 110 and group of reference microphones 120 instead of a single enhanced microphone 110 and single reference microphone 120. In this embodiment, the enhanced microphone signal and reference microphone signal inputted to the processes above may comprise, for example, an average of all of the enhanced microphones and the reference microphones respectively. Then the processes described above select either the enhanced microphone group or the reference group. Furthermore in one embodiment, once either the enhanced microphones 110 or reference microphones 120 are selected, a separate selection algorithm may be applied to select an audio block from one of the microphones in the selected group to provide to the audio encoder 140 (e.g., the signal with the lowest noise).

In another embodiment, a process selects a subset of microphones out of a group of microphones that may include reference microphones or enhanced microphones. FIG. 5 illustrates an embodiment of a process performed by the microphone selection controller 130 for choosing N microphones out of a group of M microphones. Audio signals are received 502 from each of the microphones in the group. Adverse conditions such as wind (e.g., low correlation value) or wet microphone (e.g., using the process of FIG. 4) are detected 504 if present. If no adverse conditions (e.g., wind, water, etc.) are detected, the microphone selection controller 130 selects 506 N microphones in the group of M microphones that are pre-identified as being preferred microphones. If adverse conditions are detected (e.g., wind or water) the RMS levels of each of the M microphones are measured 508 and a bias value is added to each microphone. In one embodiment, the bias value is determined based on the bias equations (2)-(4) described above. In alternative embodiments, the bias value for each microphone may be different depending on the configuration of each microphone. For example, in one embodiment, the bias function can be a function of the correlation metric, the RMS values of all other microphones and the determination of whether or not the microphone is under water. Then, the N microphones having the lowest sums of their respective bias values and RMS levels are selected 510. Mathematically, the process described above can be represented by the following equations:

$$\vec{J} = \begin{bmatrix} J_1 \\ J_2 \\ \ldots \\ J_M \end{bmatrix} = \begin{bmatrix} f_1(X, R_1, R_2, \ldots, R_M) \\ f_2(X, R_1, R_2, \ldots, R_M) \\ \ldots \\ f_M(X, R_1, R_2, \ldots, R_M) \end{bmatrix}$$

where the microphone selection controller 130 picks the N microphones having the smallest cost value of J and where $J_i$ is a cost value associated with the ith microphone, X is the correlation metric, R is the RMS value of the ith microphone, and $f_i$ is a predefined cost function.

In the case of only a single reference microphone 120 and a single enhanced microphone 120, $f_1(X, R_1, R_2) = R_1 + g(X)$ and $f_2(X, R_1, R_2) = R_2$ where g(X) is the piecewise linear function described in the bias equations above, $f_1$ is the cost function for the enhanced microphone 110 and $f_2$ is the cost function for the reference microphone 120. In one embodiment, a hysteresis bias may also be included as described above, except with potentially different thresholds, depending on the configuration.

Example Camera System Configuration

Figure 6A:
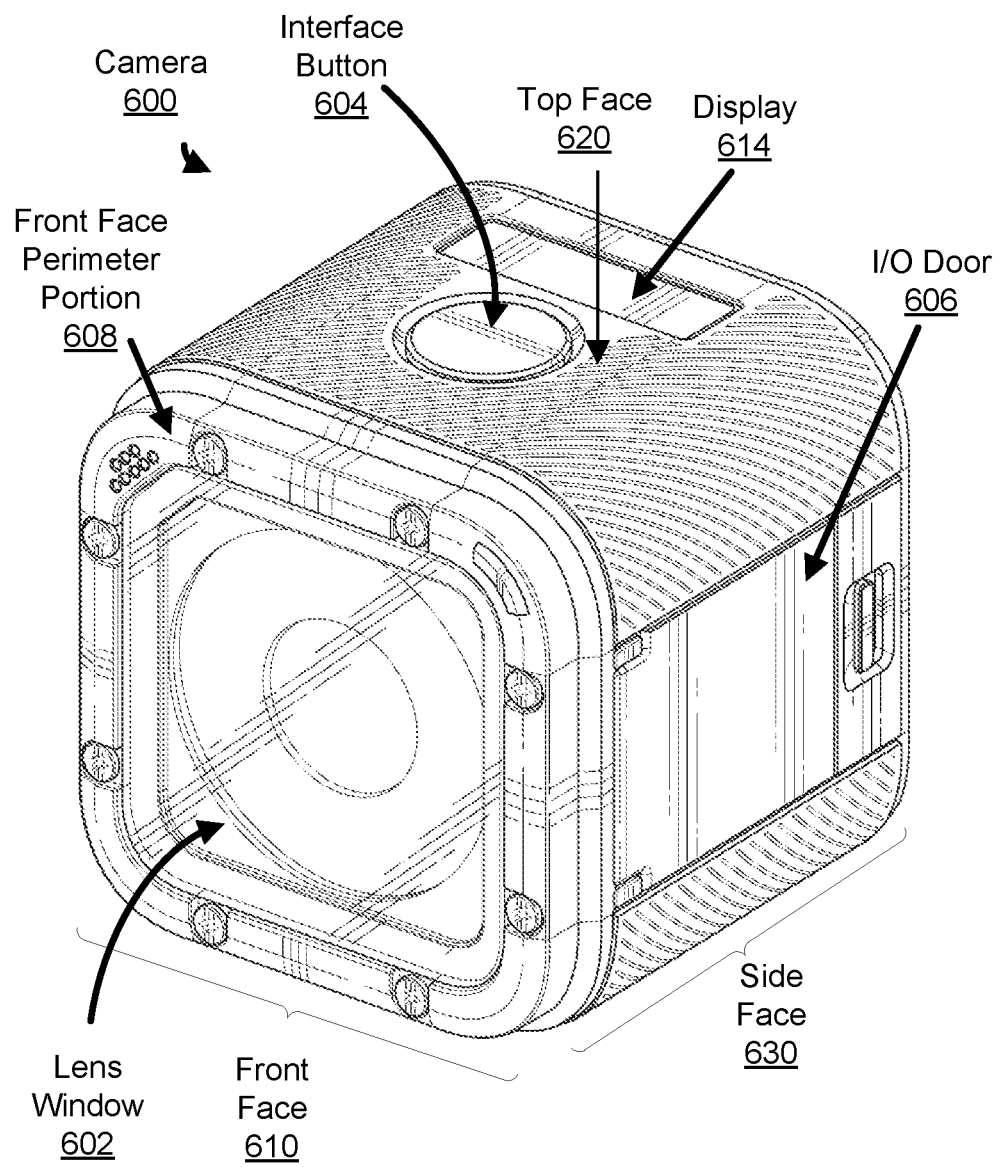
FIG. 6A is first perspective view of an example camera system.
Figure 6B:
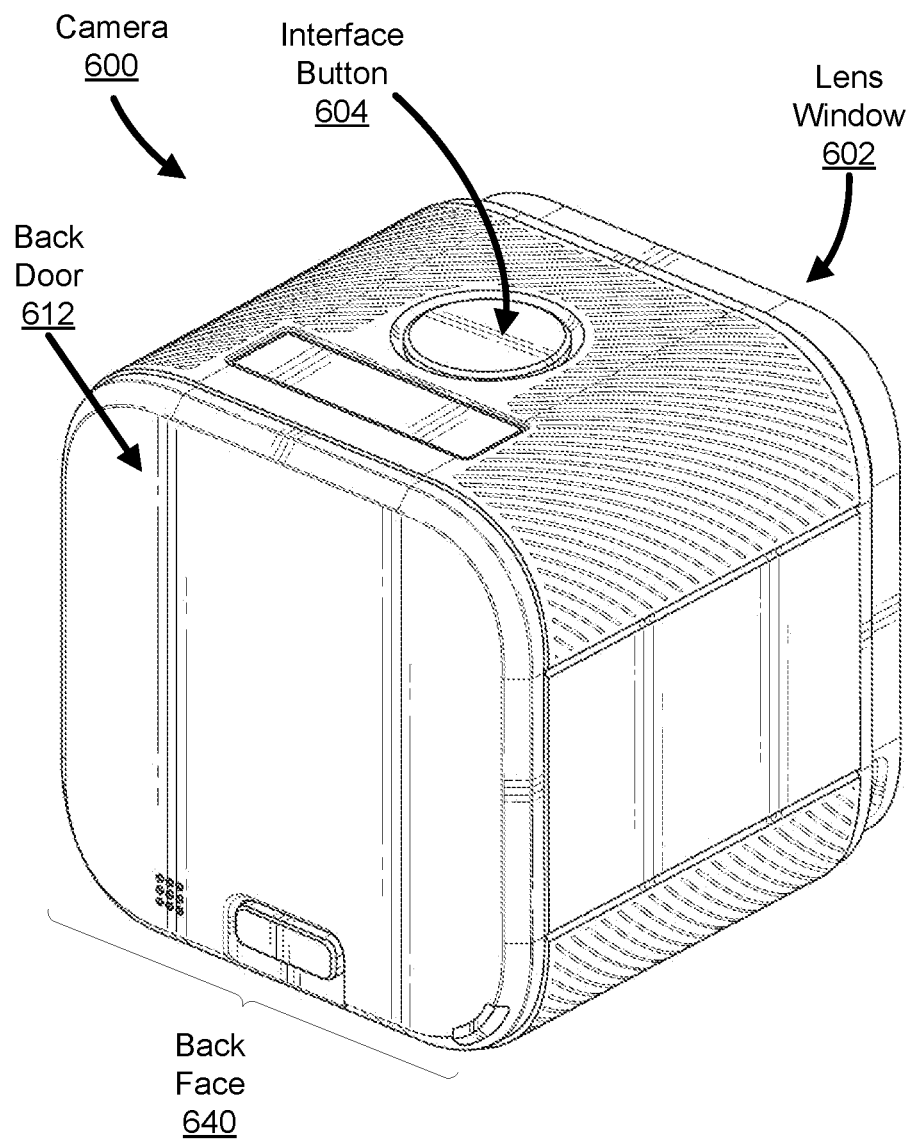
FIG. 6B is second perspective view of an example camera system.

FIGS. 6A-6B illustrate perspective views of an example camera 600 in which the audio capture system 100 may be integrated. The camera 600 comprises at least one cross-section having four approximately equal length sides in a two-dimensional plane. Although the cross-section is substantially square, the corners of the cross-section may be rounded in some embodiments (e.g., a rounded square or squircle). The exterior of the square camera 600 includes 6 surfaces (i.e. a front face, a left face, a right face, a back face, a top face, and a bottom face). In the illustrated embodiment, the exterior surfaces substantially conform to a rectangular cuboid, which may have rounded or unrounded corners. In one example embodiment, all camera surfaces may also have a substantially square (or rounded square) profile, making the square camera 600 substantially cubic. In alternate embodiments, only two of the six faces (e.g., the front face 610 and back face 640) have equal length sides and the other faces may be other shapes, such as rectangles. The camera 600 can have a small form factor (e.g. a height of 2 cm to 9 cm, a width of 2 cm to 9 cm, and a depth of 2 cm to 9 cm) and is made of a rigid material such as plastic, rubber, aluminum, steel, fiberglass, or a combination of materials. In other embodiments, the camera 600 may have a different form factor.

In an embodiment, the camera 600 includes a camera lens window 602 surrounded by a front face perimeter portion 608 on a front face 610, an interface button 604 and a display 614 on a top face 620, an I/O door 606 on a side face 630, and a back door 612 on a back face 640. The camera lens window 602 comprises a transparent or substantially transparent material (e.g., glass or plastic) that enables light to pass through to an internal lens assembly. In one embodiment, the camera lens window 602 is substantially flat (as opposed to a convex lens window found in many conventional cameras). The front face 610 of the camera 600 furthermore comprises a front face perimeter portion 608 that surrounds the lens window 602. In one embodiment, the front face perimeter portion 608 comprises a set of screws to secure the front face perimeter portion 608 to the remainder of the housing of the camera 600 and to hold the lens window 602 in place.

The interface button 604 provides a user interface that when activated enables a user to control various functions of the camera 600. For example, pressing the button 604 may control the camera to power on or power off, take pictures or record video, save a photo, adjust camera settings, or perform any other action relevant to recording or storing digital media. In one embodiment, the interface button 604 may perform different functions depending on the type of interaction (e.g., short press, long press, single tap, double tap, triple tap, etc.) In alternative embodiments, these functions may also be controlled by other types of interfaces such as a knob, a switch, a dial, a touchscreen, voice control, etc. Furthermore, the camera 600 may have more than one interface button 604 or other controls. The display 614 comprises, for example, a light emitting diode (LED) display, a liquid crystal display (LCD) or other type of display for displaying various types of information such as camera status and menus. In alternative embodiments, the interface button 604, display 606, and/or other interface features may be located elsewhere on the camera 600.

The I/O door 606 provides a protective cover for various input/output ports of the camera 600. For example, in one embodiment, the camera 600 includes a Universal Serial Bus (USB) port and/or a High-Definition Media Interface (HDMI) port, and a memory card slot accessible behind the I/O door 606. In other embodiments, additional or different input/output ports may be available behind the I/O door 606 or elsewhere on the camera 600.

The back door 612 provides a protective cover that when removed enables access to internal components of the camera 600. For example, in one embodiment, a removable battery is accessible via the back door 612.

In some embodiments, the camera 600 described herein includes features other than those described below. For example, instead of a single interface button 604, the square camera 600 can include additional buttons or different interface features such as a speakers and/or various input/output ports.

In one embodiment, the reference microphone 110 is integrated with or near the back door 612 of the camera 600 such that it is positioned near the rear of the camera 600, and the enhanced microphone is integrated with the front face 610 of the camera 600 such that it is positioned near the front of the camera 600.

Figure 7:
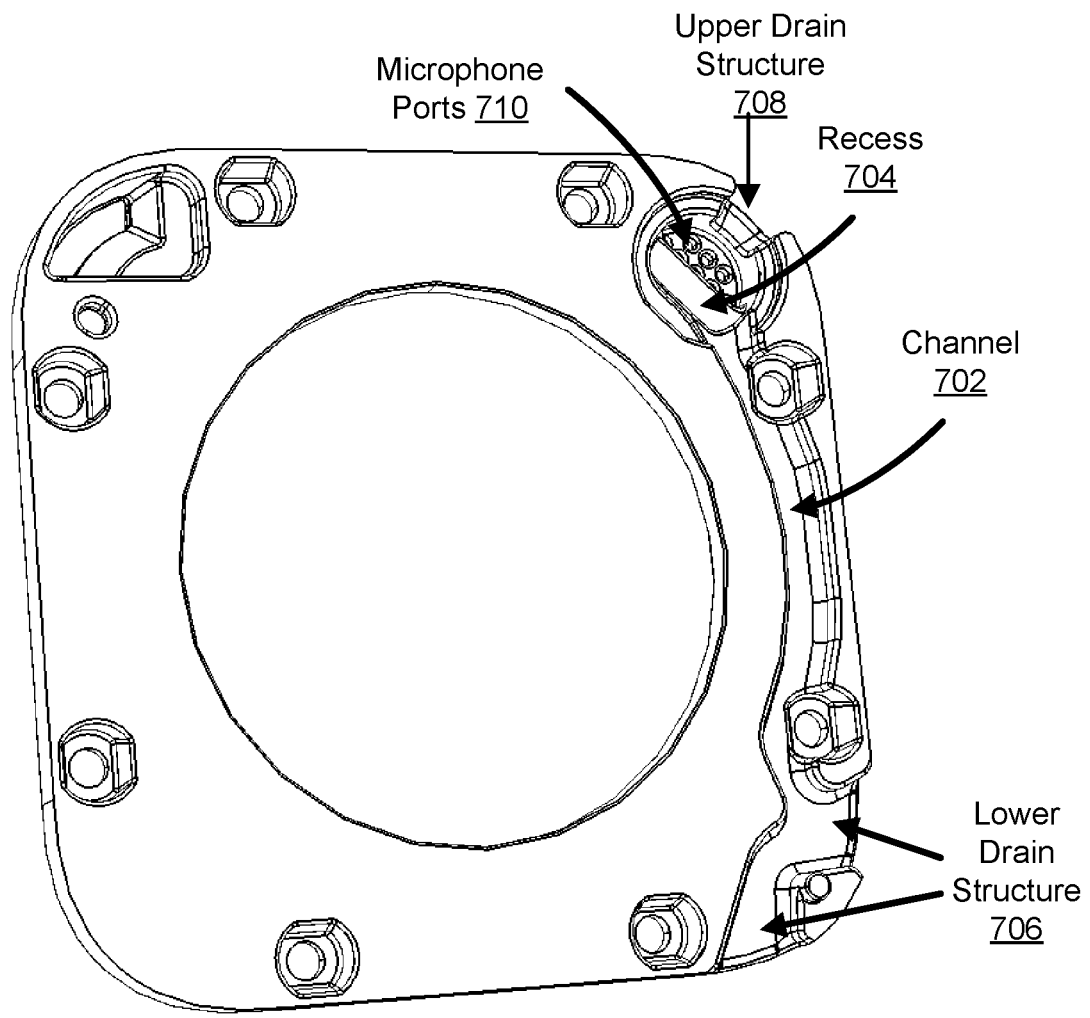
FIG. 7 illustrates an example of a drainage enhancement feature for an enhanced microphone in a camera system.

FIG. 7 illustrates an example of a front face perimeter portion 608 of a camera 600 with an integrated drain enhancement feature in the form of a channel 702 between a recess 704 where the enhanced microphone 110 (not shown) is positioned, and one or more drains (e.g, an upper drain structure 708 and a lower drain structure 706, each of which may comprise a single drain or multiple drains) to enable liquid to drain. Microphone ports 710 provide openings to let sound reach the microphone(s) housed in recess 704. In one embodiment, the upper drain structure 708 is positioned above the channel 702 and the lower drain structure 706 is positioned below the channel 702. The lower drain structure 706 is generally much larger than the upper drain structure 708.

When the camera 600 is submerged the entire channel 702 generally fills with water. When the camera 600 emerges from the water, the large mass of water in the channel 702 flows out through the lower drain structure 706 through the force of gravity. This pulls air in through upper drain structure 708 and clears water from the recess 704, the upper drain structure 708, and/or the microphone ports 710, thus allowing the microphone to resume normal acoustic performance.

Additional Configuration Considerations

Throughout this specification, some embodiments have used the expression "coupled" along with its derivatives. The term "coupled" as used herein is not necessarily limited to two or more elements being in direct physical or electrical contact. Rather, the term "coupled" may also encompass two or more elements are not in direct contact with each other, but yet still co-operate or interact with each other, or are structured to provide a drainage path between the elements.

Likewise, as used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Finally, as used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Upon reading this disclosure, those of skill in the art will appreciate still additional alternative structural and functional designs as disclosed from the principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. An audio capture system comprising:
   a first microphone;
   a second microphone;
   a processor; and
   a memory storing instructions that when executed by the processor cause the processor to perform steps including:
   a non-transitory computer-readable medium storing instructions for generating an output audio signal, the instructions when executed by the processor causing the processor to perform steps including:
  determining a first correlation metric between a first portion of a first audio signal of the first microphone and a first portion of a second audio signal of the second microphone captured during a first time interval, the first correlation metric representing a similarity between the first portion of the first audio signal and the first portion of the second audio signal during the first time interval; and
  responsive to the first correlation metric exceeding a first predefined threshold, storing the first portion of the first audio signal as a first portion of the output audio signal corresponding to the first time interval.

2. The audio capture system of claim 1, the instructions when executed further causing the processor to perform steps including:
  determining a second correlation metric between a second portion of the first audio signal and a second portion of the second audio signal captured during a second time interval;
  responsive to determining that the second correlation metric does not exceed the first predefined threshold, determining if the first and second microphones are submerged in liquid during the second time interval;
  responsive to determining that the first and second microphones are submerged in liquid during the second time interval, determining a first noise metric for the second portion of the first audio signal and a second noise metric for the second portion of the second audio signal during the second time interval; and
  selecting between storing the second portion of the first audio signal and the second portion of the second audio signal as a second portion of the output audio signal corresponding to the second time interval based on the first and second noise metrics.

3. The audio capture system of claim 2, wherein selecting between storing the second portion of the first audio signal and the second portion of the second audio signal comprises:
  selecting the second portion of the first audio signal responsive to a sum of the first noise metric and a bias value being less than the second noise metric.

4. The audio capture system of claim 2, wherein selecting between storing the second portion of the first audio signal and the second portion of the second audio signal comprises:
  selecting the second portion of the second audio signal responsive to a sum of the first noise metric and a bias value being greater than the second noise metric.

5. The audio capture system of claim 1, the instructions when executed further causing the processor to perform steps including:
  determining a second correlation metric between a second portion of the first audio signal and a second portion of the second audio signal captured during a second time interval;
  responsive to determining that the second correlation metric does not exceed the first predefined threshold, determining whether the first microphone is wet but is not submerged in liquid during the second time interval; and
  responsive to determining that the first microphone is wet but is not submerged during the second time interval, storing the second portion of the second audio signal as a second portion of the output audio signal corresponding to the second time interval.

6. The audio capture system of claim 1, the instructions when executed further causing the processor to perform steps including:
  determining a second correlation metric between a second portion of the first audio signal and a second portion of the second audio signal captured during a second time interval;
  responsive to determining that the second correlation metric does not exceed the first predefined threshold, determining whether the first microphone is wet during the second time interval;
  responsive to determining that first microphone is wet during the second time interval, determining a first noise metric for the second portion of the first audio signal and a second noise metric for the second portion of the second audio signal during the second time interval; and
  selecting between storing the second portion of the first audio signal and the second portion of the second audio signal as a second portion of the output audio signal corresponding to the second time interval based on the first and second noise metrics.

7. The audio capture system of claim 6, wherein selecting between storing the second portion of the first audio signal and the second portion of the second audio signal comprises:
  selecting the second portion of the first audio signal responsive to a sum of the first noise metric and a bias value being less than the second noise metric.

8. The audio capture system of claim 6, wherein selecting between storing the second portion of the first audio signal and the second portion of the second audio signal comprises:
  selecting the second portion of the second audio signal responsive to a sum of the first noise metric and a bias value being greater than the second noise metric.

9. The audio capture system of claim 6, wherein determining if the first microphone is wet comprises:
  determining a first average signal level of the second portion of the first audio signal and a second average signal level for the second portion of the second audio signal;
  determining if a wind condition is detected during the second time interval; and
  responsive to a ratio of the first average signal level to the second average signal level exceeding a second predefined threshold or to detecting the wind condition, determining that the first microphone is not wet.

10. The audio capture system of claim 6, wherein determining if the first microphone is wet comprises:
  determining a first average signal level of the second portion of the first audio signal and a second average signal level for the second portion of the second audio signal;
  determining if a wind condition is detected during the second time interval; and
  responsive to a ratio of the first average signal level to the second average signal level not exceeding a second predefined threshold and to not detecting the wind condition, determining that the first microphone is wet.

11. A method for generating an output audio signal in an audio capture system, the method comprising:
  receiving a first audio signal from a first microphone of the audio capture system;
  receiving a second audio signal from a second microphone of the audio capture system;
  determining a first correlation metric between a first portion of the first audio signal and a first portion of the second audio signal captured during a first time interval, the first correlation metric representing a similarity between the first portion of the first audio signal and the first portion of the second audio signal during the first time interval; and responsive to the first correlation metric exceeding a first predefined threshold, storing the first portion of the first audio signal as a first portion of the output audio signal corresponding to the first time interval.

12. The method of claim 11, further comprising:
determining a second correlation metric between a second portion of the first audio signal and a second portion of the second audio signal captured during a second time interval;
responsive to the second correlation metric not exceeding the first predefined threshold, determining if the first and second microphones are submerged in liquid during the second time interval;
responsive to determining that the first and second microphones are submerged in liquid during the second time interval, determining a first noise metric for the second portion of the first audio signal and a second noise metric for the second portion of the second audio signal during the second time interval; and
selecting between storing the second portion of the first audio signal and the second portion of the second audio signal as a second portion of the output audio signal corresponding to the second time interval based on the first and second noise metrics.

13. The method of claim 11, further comprising:
determining a second correlation metric between a second portion of the first audio signal and a second portion of the second audio signal captured during a second time interval;
responsive to determining that the second correlation metric does not exceed the first predefined threshold, determining whether the first microphone is wet but is not submerged in liquid during the second time interval; and
responsive to determining that the first microphone is wet but is not submerged during the second time interval, storing the second portion of the second audio signal as a second portion of the output audio signal corresponding to the second time interval.

14. The method of claim 11, further comprising:
determining a second correlation metric between a second portion of the first audio signal and a second portion of the second audio signal captured during a second time interval;
responsive to determining that the second correlation metric does not exceed the first predefined threshold, determining whether the first microphone is wet during the second time interval;
responsive to determining that the first microphone is wet during the second time interval, determining a first noise metric for the second portion of the first audio signal and a second noise metric for the second portion of the second audio signal during the second time interval; and
selecting between storing the second portion of the first audio signal and the second portion of the second audio signal as a second portion of the output audio signal corresponding to the second time interval based on the first and second noise metrics.

15. The method of claim 14, wherein determining if the first microphone is wet comprises:

determining a first average signal level of the second portion of the first audio signal and a second average signal level for the second portion of the second audio signal;
determining if a wind condition is detected during the second time interval; and
responsive to a ratio of the first average signal level to the second average signal level not exceeding a second predefined threshold and to not detecting the wind condition, determining that the first microphone is wet.

16. A non-transitory computer-readable medium storing instructions, the instructions when executed by a processor causing the processor to perform steps including:
receiving a first audio signal from a first microphone that includes a drain;
receiving a second audio signal from a second microphone;
determining a first correlation metric between a first portion of the first audio signal and a first portion of the second audio signal captured during a first time interval; and
responsive to the first correlation metric exceeding a first predefined threshold, storing the first portion of the first audio signal as a first portion of an output audio signal corresponding to the first time interval.

17. The non-transitory computer-readable medium of claim 16, the instructions when executed further causing the processor to perform steps including:
determining a second correlation metric between a second portion of the first audio signal and a second portion of the second audio signal captured during a second time interval;
responsive to the second correlation metric not exceeding the first predefined threshold, determining if the first and second microphones are submerged in liquid during the second time interval;
responsive to determining that the first and second microphones are submerged in liquid during the second time interval, determining a first noise metric for the second portion of the first audio signal and a second noise metric for the second portion of the second audio signal during the second time interval; and
selecting between storing the second portion of the first audio signal and the second portion of the second audio signal as a second portion of the output audio signal corresponding to the second time interval based on the first and second noise metrics.

18. The non-transitory computer-readable medium of claim 16, the instructions when executed further causing the processor to perform steps including:
determining a second correlation metric between a second portion of the first audio signal and a second portion of the second audio signal captured during a second time interval;
responsive to determining that the second correlation metric does not exceed the first predefined threshold, determining whether the first microphone is wet but is not submerged in liquid during the second time interval; and
responsive to determining that the first microphone is wet but is not submerged in liquid during the second time interval, storing the second portion of the second audio signal as a second portion of the output audio signal corresponding to the second time interval.

19. The non-transitory computer-readable medium of claim 16, the instructions when executed further causing the processor to perform steps including:

determining a second correlation metric between a second portion of the first audio signal and a second portion of the second audio signal captured during a second time interval;

responsive to determining that the second correlation metric does not exceed the first predefined threshold, determining whether the first microphone is wet during the second time interval;

responsive to determining that first microphone is wet during the second time interval, determining a first noise metric for the second portion of the first audio signal and a second noise metric for the second portion of the second audio signal during the second time interval; and selecting between storing the second portion of the first audio signal and the second portion of the second audio signal as a second portion of the output audio signal corresponding to the second time interval based on the first and second noise metrics.

20. The non-transitory computer-readable medium of claim 19, wherein determining if the first microphone is wet comprises:

determining a first average signal level of the second portion of the first audio signal and a second average signal level for the second portion of the second audio signal;

determining if a wind condition is detected during the second time interval; and responsive to a ratio of the first average signal level to the second average signal level not exceeding a second predefined threshold and to not detecting the wind condition, determining that the first microphone is wet.

* * * * *